US012662324B2

(12) United States Patent
Stadler et al.

(10) Patent No.: US 12,662,324 B2
(45) Date of Patent: Jun. 23, 2026

(54) METHOD AND PACKAGING SYSTEM FOR PACKAGING ARTICLES

(71) Applicant: Krones Aktiengesellschaft, Neutraubling (DE)

(72) Inventors: Thomas Stadler, Kolbermoor (DE); Philipp Schartner, Feldkirchen-Westerham (DE); Peter Dennemarck, Raubling (DE); Martin Dietersberger, Grosskarolinenfeld (DE); Christian Canalicchio, Bad Endorf (DE); Herbert Spindler, Niedermoosen (DE); Jens Losert, Reit Im Winkl (DE); Josef Unterseher, Rohrdorf (DE)

(73) Assignee: Krones Aktiengesellschaft, Neutraubling (DE)

( * ) Notice: Subject to any disclaimer, the term of this patent is extended or adjusted under 35 U.S.C. 154(b) by 147 days.

(21) Appl. No.: 18/279,990

(22) PCT Filed: Dec. 22, 2021

(86) PCT No.: PCT/EP2021/087362
§ 371 (c)(1),
(2) Date: Sep. 1, 2023

(87) PCT Pub. No.: WO2022/184308
PCT Pub. Date: Sep. 9, 2022

(65) Prior Publication Data
US 2024/0150128 A1 May 9, 2024

(30) Foreign Application Priority Data

Mar. 3, 2021 (DE) .................... 10 2021 202 068.2

(51) Int. Cl.
| | |
|---|---|
| *B65B 65/00* | (2006.01) |
| *B65B 21/18* | (2006.01) |

(Continued)

(52) U.S. Cl.
CPC .......... *B65G 21/2027* (2013.01); *B65B 21/18* (2013.01); *B65B 43/52* (2013.01);

(Continued)

(58) Field of Classification Search
CPC ....... B65B 43/52; B65B 43/54; B65B 43/145; B65B 59/005; B65B 59/003; B65B 35/44
See application file for complete search history.

(56) References Cited

U.S. PATENT DOCUMENTS

| | | | |
|---|---|---|---|
| 9,957,116 B2 * | 5/2018 | Staunton ................ | B65G 35/06 |
| 10,549,878 B2 * | 2/2020 | Ickert ...................... | B65B 7/164 |

(Continued)

FOREIGN PATENT DOCUMENTS

| | | |
|---|---|---|
| CN | 211495859 U | 9/2020 |
| DE | 3111706 A1 | 1/1982 |

(Continued)

OTHER PUBLICATIONS

German Application: DE 10 2021 202 068.2 filed Mar. 3, 2021—German Search Report dated Nov. 16, 2021.

(Continued)

*Primary Examiner* — Andrew M Tecco
(74) *Attorney, Agent, or Firm* — Simmons Perrine PLC

(57) ABSTRACT

The invention relates to a method and a system for packaging articles (2). Outer packages (3) are set down on a horizontal conveying device (10, 20) and are transported along a packaging line. During the transport, articles are introduced via a manipulator into the outer packages (3), and the outer packages (3) with the introduced articles (2) are subsequently removed from the horizontal conveying device (Continued)

(10, 20) as a packaging unit (8). A predetermined packaging process (VP1) is carried out, in which the outer packages (3) are received by the horizontal conveying device (10, 20) via a plurality of shuttles (5), the outer packages (3) standing on said plurality of shuttles (5), until the outer packages (3) together with the introduced articles (2) are removed from the at least one horizontal conveying device (10, 20) as a packaging unit (8).

18 Claims, 14 Drawing Sheets

(51) Int. Cl.

| | | |
|---|---|---|
| *B65B 43/52* | (2006.01) | |
| *B65B 43/54* | (2006.01) | |
| *B65B 65/02* | (2006.01) | |
| *B65G 17/00* | (2006.01) | |
| *B65G 17/46* | (2006.01) | |
| *B65G 21/20* | (2006.01) | |

(52) U.S. Cl.
CPC ............ *B65B 43/54* (2013.01); *B65B 65/003* (2013.01); *B65B 65/02* (2013.01); *B65G 17/002* (2013.01); *B65G 17/46* (2013.01)

(56) References Cited

U.S. PATENT DOCUMENTS

| | | | | |
|---|---|---|---|---|
| 10,577,136 | B2 * | 3/2020 | Burk | ........................ B65B 43/56 |
| 10,597,233 | B2 * | 3/2020 | Herbig | ................... B65G 43/00 |
| 12,077,328 | B2 | 9/2024 | Losert | |
| 2009/0205929 | A1 * | 8/2009 | DeGuglielmo | ......... B65B 5/105 |
| | | | | 198/347.1 |
| 2013/0084157 | A1 * | 4/2013 | Staunton | ............... B65G 47/91 |
| | | | | 414/752.1 |
| 2016/0107782 | A1 | 4/2016 | Hutter et al. | |
| 2016/0236809 | A1 * | 8/2016 | Ickert | ........................ B65B 5/08 |
| 2017/0225908 | A1 * | 8/2017 | Staunton | ............... B65G 47/91 |
| 2018/0265230 | A1 * | 9/2018 | Burk | ...................... B65G 54/02 |
| 2019/0185190 | A1 | 6/2019 | Fechter et al. | |
| 2019/0337726 | A1 * | 11/2019 | Herbig | ................... B65G 43/00 |

FOREIGN PATENT DOCUMENTS

| | | | | |
|---|---|---|---|---|
| DE | 3601699 | A1 | 7/1987 | |
| DE | 102018123106 | A1 | 3/2020 | |
| EP | 3272657 | A1 * | 1/2018 | ............. B65B 43/52 |

OTHER PUBLICATIONS

PCT Application: PCT/EP2021/087362 filed Mar. 3, 2021—International Search Report dated Jun. 13, 2022.
PCT Application: PCT/EP2021/087362 filed Mar. 3, 2021—Partial International Search Report dated Apr. 7, 2022.
PCT Application: PCT/EP2021/087362 filed Dec. 22, 2021—International Preliminary Report on Patentability dated Sep. 14, 2023 and English Translation.
Chinese Office Action dated Nov. 13, 2025.

* cited by examiner

METHOD AND PACKAGING SYSTEM FOR PACKAGING ARTICLES

CLAIM OF PRIORITY

The present application claims priority to International Application PCT/EP2021/087362 dated Dec. 22, 2021, which in turn claims priority to German Application DE 10 2021 202 068.2 dated Mar. 3, 2021, which are incorporated by reference.

FIELD OF THE INVENTION

The present invention relates to a method for packaging articles and a packaging system for packaging articles.

BACKGROUND OF THE INVENTION

Handling articles or manipulating articles frequently means providing individual or multiple articles with an outer package, which can be designed as a container or as a sheath. Such equipping with an outer package is carried out in the case of individual articles for improved protection thereof and/or improved sales presentation thereof. In the case of several articles, the outer package additionally forms a packaging unit in which the individual articles can be protected from damage, during the course of transport, via the outer package functioning as a component of the packaging unit. This is particularly the case when the outer package is designed as a cardboard package in which several articles are completely accommodated. Thus, such packaging units provide an effective option for enabling simultaneous handling of several articles, and in particular for facilitating transport of several articles.

Folding boxes are often used as outer packages, each accommodating several articles, because they offer quite good protection for the articles accommodated therein and, in addition, are stackable with the articles located in their interior and, moreover, enable the identification of the articles accommodated therein by information printed or glued on their outer side. They can also be used as advertising carriers via corresponding information or printings applied to their outside.

Folding boxes are industrially prefabricated containers of particularly small spatial or package dimensions which are folded together or collapsed and usually cuboid in shape, and which are transported and stored in a space-saving manner in the collapsed state until their particular intended use in order to be unfolded to form the outer package—if necessary, with simple manual manipulation or by machine, as is known, for example, from folding boxes used for postal packages. In the folded state, such folding cartons or boxes require relatively little space for transport and storage.

After such outer packages have been unfolded, they are in practice moved largely without interruption to produce the packaging unit, wherein articles are inserted into the unfolded outer packages during the interruption-free movement, and the unfolded outer packages are closed after the insertion of the articles. Conveyor chains with which the outer packages are in surface contact and which slide the outer packages along a conveying section or transport path exist for the purpose of transport or interruption-free movement of the outer packages.

It has been shown in practice that outer packages can be soiled by contact with the conveyor chains or with sliding elements arranged on the conveyor chains, whereby their external appearance can be unintentionally impaired. It may also be the case that the outer packages are soiled and/or damaged by the sliding movement along the conveying section or transport path, as a result of which the outer appearance can likewise be unintentionally impaired. In particular, this is the case if the outer packages have an outer surface in a bright color and/or a glossy or reflective outer surface.

The object of the invention is therefore to provide an appropriate option which at least partially avoids the aforementioned disadvantages.

SUMMARY OF THE INVENTION

The above object is achieved by a method and a packaging system which comprise the features in the independent claims. Advantageous embodiments are described by the dependent claims.

The invention relates to a method for packaging articles. The articles which are packaged by the method can be formed, for example, by beverage containers and in particular by beverage bottles and/or by beverage cans.

One step provides for setting down outer packages on at least one horizontal conveying device, which at least one horizontal conveying device transports the outer packages set down thereon along a packaging section. In the course of the transport along the packaging section, articles are introduced into the outer packages, already set down on the at least one horizontal conveying device, by the at least one manipulator, and the outer packages together with the introduced articles are then removed from the at least one horizontal conveying device as a packaging unit.

It is provided that a predetermined packaging process be carried out, in which the outer packages are received by the at least one horizontal conveying device via several shuttles, the outer packages standing on said several shuttles, until the outer packages together with the introduced articles are removed from the at least one horizontal conveying device as a packaging unit. As a result, a risk of outer packages being unintentionally soiled during transport can be kept very low.

It may be the case that each of the several shuttles temporarily fixes a received outer package mechanically and/or by negative pressure. A respective shuttle can be designed for the form-fitting reception of at least one outer package. In practice, it has proven effective if a particular shuttle can accommodate at least two outer packages in a form-fitting manner.

It is further conceivable that each of the several shuttles have several suction elements, via which several suction elements the several shuttles each temporarily fix a received outer package via negative pressure and to which several suction elements a common line system of the respective shuttle is assigned, said common line system supplying the several suction elements of the respective shuttle for temporarily fixing a respective outer package with negative pressure.

It may also be the case that the outer packages are received by a horizontal conveying device via the shuttles or the several shuttles and, together with the respective shuttle thereof, switch to a second horizontal conveying device, on which second horizontal conveying device the articles are introduced by the at least one manipulator into the outer packages. It may be the case here that the shuttles for switching from the first horizontal conveying device to the second horizontal conveying device are moved by a transfer unit from the first horizontal conveying device to the second horizontal conveying device, which transfer unit is located at least partially or completely below a transport level formed for the shuttles.

Alternatively or additionally, it may be the case that the shuttles or the several shuttles for returning from the second horizontal conveying device to the first horizontal conveying device are moved by a transfer unit from the second horizontal conveying device to the first horizontal conveying device, which transfer unit is located at least partially or completely below a transport level formed for the shuttles.

As mentioned above, it may be the case that the outer packages are received by a first horizontal conveying device via the shuttles and, together with their respective shuttle, switch to a second horizontal conveying device, on which second horizontal conveying device the articles are introduced by the at least one manipulator into the outer packages.

It is conceivable here that the several shuttles each have a gearing which is preferably formed via a gear rack, the several shuttles being moved from the first horizontal conveying device to the second horizontal conveying device when said respective gearing is engaged, and/or each of the several shuttles being moved from the second horizontal conveying device back to the first horizontal conveying device when said respective gearing is engaged.

It may be the case that at least one gear wheel circumferentially drives at least one chain, which at least one chain is brought into engagement with the gearing of a respective shuttle that is preferably formed via a gear rack, which leads to the result that the several shuttles are moved from the first horizontal conveying device to the second horizontal conveying device, and/or to the result that the several shuttles are moved from the second horizontal conveying device back to the first horizontal conveying device.

In addition, it is conceivable for various embodiments that each of the several shuttles have a gearing which is preferably formed by a gear rack and which, in order to move the respective shuttle to the second horizontal conveying device and/or to move the respective shuttle back to the first horizontal conveying device, is brought into meshing engagement with a circumferentially—and/or rotationally-driven counter-gearing of the transfer unit.

It may be the case that, after carrying out the predetermined packaging process, there is a switch to a further packaging process, in which further packaging process the shuttles connected to the at least one horizontal conveying device up to that point, in order to carry out the further packaging process, are removed from the at least one horizontal conveying device, and at least one transfer plate is arranged along two parallel conveyor sections of the at least one horizontal conveying device. In the further packaging process, it may be provided that the outer packages be received in the region of the first conveyor section and, making surface contact with the at least one transfer plate, be pushed by a deployment device onto the second conveyor section, on which second conveyor section the articles are introduced by the at least one manipulator into the outer packages, whereupon the outer packages with the introduced articles are then removed from the second conveyor section as a packaging unit.

The invention also relates to a packaging system for packaging articles. Features which were previously mentioned for various embodiments of the method according to the invention can likewise be provided in the embodiments of the packaging system described below, and are not mentioned multiple times.

Likewise, the features described below for the various embodiments of the method according to the invention can be provided in various embodiments of the packaging system already described above. In various embodiments, the packaging system can be designed to carry out the embodiments of the method according to the invention described below or be prepared for this purpose.

The packaging system comprises at least one horizontal conveying device and at least one manipulator, which is designed for setting outer packages down on the at least one horizontal conveying device and for introducing articles into the outer packages set down on the at least one horizontal conveying device. In the packaging system, it is provided that, by the packaging system, a predetermined packaging process be able to be carried out in which several shuttles designed as a component of the packaging system are provided, which shuttles can be releasably arranged on the at least one horizontal conveying device, so that outer packages can be set down via the at least one manipulator on the several shuttles arranged releasably on the at least one horizontal conveying device, and articles can be inserted into the outer packages set down on the several shuttles.

The several shuttles can be designed such that the several shuttles can each temporarily fix the received outer packages mechanically or temporarily via negative pressure.

The several shuttles can also each have several suction elements, via which several suction elements each of the several shuttles can temporarily fix a received outer package via negative pressure. It may be the case here that the several shuttles each comprise a common line system for the respective several suction elements, via which common line system each of the respective several suction elements of a respective shuttle are fluidically connected one to another.

The packaging system can comprise a first horizontal conveying device and a second horizontal conveying device. The first horizontal conveying device can be arranged in such a way that outer packages can be set down by the at least one manipulator on the several shuttles arranged releasably on the first horizontal conveying device.

Furthermore, the second horizontal conveying device can be arranged in such a way that articles can be introduced by the at least one manipulator into the several shuttles arranged releasably on the second horizontal conveying device. In addition, at least one transfer unit can be provided which is designed for moving the several shuttles from the first horizontal conveying device to the second horizontal conveying device, and/or which at least one transfer unit is designed for returning the shuttles from the second horizontal conveying device to the first horizontal conveying device. It may be the case here that the at least one transfer unit is located at least partially or completely below a transport level designed for the shuttles.

As already mentioned above, the packaging system may optionally comprise a first horizontal conveying device and a second horizontal conveying device, wherein the first horizontal conveying device is arranged in such a way that outer packages can be set down on the several shuttles, releasably arranged on the first horizontal conveying device, by the at least one manipulator.

The second horizontal conveying device can be arranged in such a way that articles can be introduced by the at least one manipulator into the several shuttles arranged releasably on the second horizontal conveying device. The several shuttles here can each have a gearing, wherein at least one transfer unit is provided which, when engaged with a respective gearing of a respective shuttle, can move the several shuttles from the first horizontal conveying device to the second horizontal conveying device and/or can move them from the second horizontal conveying device back to the first horizontal conveying device.

It may be the case that the respective gearing of a respective shuttle is designed as a lantern pinion gearing and that the at least one transfer unit comprises at least one gear wheel and at least one chain circumferentially driven via the at least one gear wheel, with which at least one chain driven circumferentially via the at least one gear wheel the respective shuttle can be temporarily brought into engagement via the gearing, designed as a lantern pinion gearing, for a movement from the first horizontal conveying device to the second horizontal conveying device and/or for the movement from the second horizontal conveying device back to the first horizontal conveying device.

In further conceivable embodiments, the shuttles can each have a gearing. The transfer unit may also have a rotationally-drivable counter-gearing with which the respective gearing of the several shuttles can be brought into meshing engagement for moving from the first horizontal conveying device to the second horizontal conveying device or for moving from the second horizontal conveying device back to the first horizontal conveying device.

It may also be the case that the transfer unit has at least one toothed belt instead of and/or in addition to the chain circumferentially driven via the at least one gear wheel, on which toothed belt several gripping elements are arranged, via which several gripping elements the several shuttles are moved from the first horizontal conveying device to the second horizontal conveying device and/or via which several gripping elements the several shuttles are moved from the second horizontal conveying device back to the first horizontal conveying device.

It may also be the case that at least one transfer unit is provided which is designed as a friction wheel conveyor and via which a respective shuttle of the several shuttles can be moved from the first horizontal conveying device to the second horizontal conveying device and/or moved from the second horizontal conveying device back to the first horizontal conveying device.

As already mentioned, it may be the case that the packaging system comprises a first horizontal conveying device and a second horizontal conveying device, wherein the first horizontal conveying device is arranged in such a way that outer packages can be set down by the at least one manipulator on the several shuttles arranged releasably on the first horizontal conveying device. Furthermore, the second horizontal conveying device can be arranged in such a way that articles can be introduced by the at least one manipulator into the several shuttles arranged releasably on the second horizontal conveying device.

The packaging system may be designed to carry out a further packaging process, in which further packaging process, when the several shuttles are removed from the at least one horizontal conveying device, at least one transfer plate is arranged along two conveyor sections, which two conveyor sections form the at least one horizontal conveying device. In addition, a deployment device can be provided, which deployment device, making surface contact with the at least one transfer plate positioned along the two conveyor section, can push outer packages from the first conveyor section onto the second conveyor section.

The following description again serves for further clarification of various aspects and is to be understood as non-limiting.

In devices known from the prior art, the problem may exist that a cardboard flat is pulled along when the robot is moved out. If a cardboard flat is set down in a shuttle using a robot, there is a risk that, when the robot is moved out, the cardboard flat is entrained again due to high travel speeds. In order to counteract this, the shuttle forms a vacuum under the cardboard flat to secure it. In order to realize this, a ground shuttle moves on a rail body until a vacuum centering is achieved. In this case, a connection is produced with the aid of a suction cup and a coupling, which makes it possible to produce the vacuum.

If the shuttle is connected to the ground shuttle, a vacuum can thus be generated on each individual shuttle. In addition, the shuttle can be expanded to further mediums, such as compressed air. The activation for each shuttle is performed individually. It should be noted as an advantage that an undesired entrainment of the cardboard flat when the robot is moved out is no longer possible. By different mediums, not only suction cups are possible for the shuttle, but all types of actuators which can operate with the transferred medium, e.g., cylinders and/or grippers, are possible.

Furthermore, it may be the case that one track is compatible with shuttles and packages. In this way, more complex bundles can be processed. Shuttles can be removed. Without shuttles, no extra track is required in order to move packs out of the machine. Shuttles can form any structures. Thus, they can also take over passive functions or even perform active functions with the aid of medium transfer and actuators installed thereon. This makes it possible to increase the lines for small or special packages. There is a lower coefficient of friction between shuttle and track than in the case of product and track. Energy can thereby be saved. A sensor system is fully functional and compatible with both alternatives.

It should be expressly mentioned at this point that all aspects and embodiment variants which have been explained in connection with the packaging system according to the invention can also relate to, or form, partial aspects of the method according to the invention. Therefore, if the description or the claim definitions pertaining to the packaging system according to the invention make mention of certain aspects and/or correlations and/or effects, this applies equally to the method according to the invention. The same applies vice versa, so that all aspects and embodiment variants which have been explained in connection with the method according to the invention can also relate to, or be, partial aspects of the packaging system according to the invention. Therefore, if the description or the claim definitions pertaining to the method according to the invention make mention of certain aspects and/or correlations and/or effects, this applies equally to the packaging system according to the invention.

Exemplary embodiments of the invention and their advantages are explained in more detail below with reference to the accompanying figures. The proportions of the individual elements relative to one another in the figures do not always correspond to the actual proportions, since some forms are simplified, while other forms are shown enlarged in relation to other elements for better illustration.

BRIEF DESCRIPTION OF THE FIGURES

If in the context of the description of the figures further below reference is also generally made to "schematic"

representations and views, this in no way means that the figure representations and their description are to be of subordinate importance with regard to the disclosure of the invention. A person skilled in the art is certainly able to derive sufficient information from the schematically and abstractly drawn representations that will make it easier for him to understand the invention without being confused in any way by the drawn and possibly not exactly true-to-scale proportions. The figures enable a person skilled in the art as reader to get a better understanding of the inventive idea-which has been formulated more generally and/or more abstractly in the claims and in the general part of the description-on the basis of the more specifically explained implementations of the method according to the invention and the more specifically explained mode of operation of the packaging system according to the invention.

Identical reference signs are used for identical elements of the invention or those having the same effect. Furthermore, for the sake of clarity, only reference signs are shown in the individual figures which are required for the description of the respective figure. The illustrated embodiments are merely examples of how the invention can be designed, and are non-limiting.

DETAILED DESCRIPTION OF THE INVENTION

Figure 1:
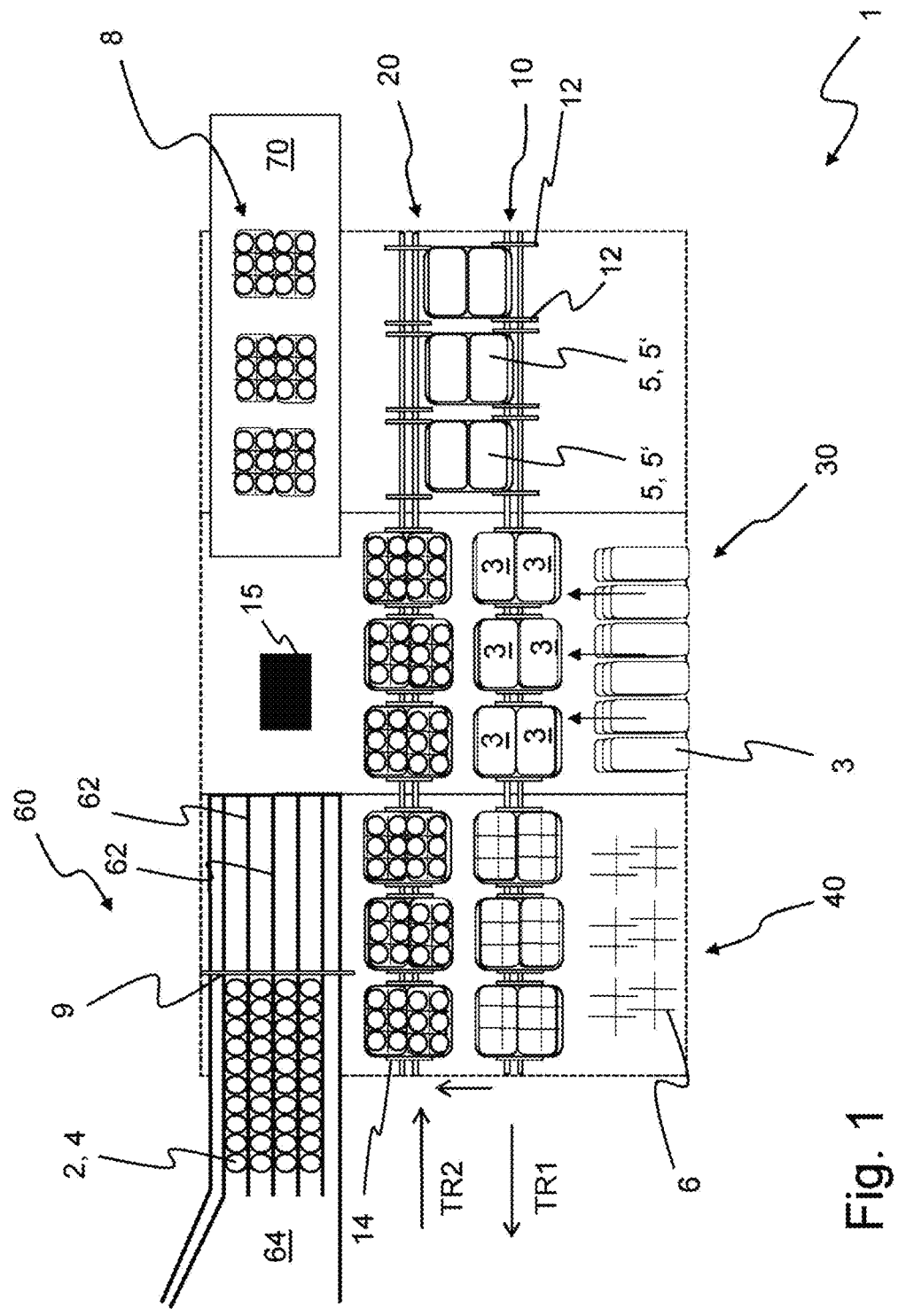
FIG. 1 is a schematic view of an embodiment of a packaging system according to the invention.

The schematic plan view of FIG. 1 illustrates a first embodiment of a packaging system according to the invention, which is generally denoted here by reference numeral 1. Articles 2, which in the present case are formed or can be formed by beverage containers 4, can be packaged via the packaging system 1. The packaging system 1 comprises a first horizontal conveying device 10 and a second horizontal conveying device 20, which are arranged next to each other.

The first horizontal conveying device 10 has several circumferentially-guided holding element 12, wherein a shuttle 5 can be held in a clamping manner on the first horizontal conveying device 10 between each two, directly successive holding element 12 of the first horizontal conveying device 10. For example, the first horizontal conveying device 10 can comprise at least one circumferentially-guided chain and/or belt drive on which the holding element 12 are arranged.

Figure 2:
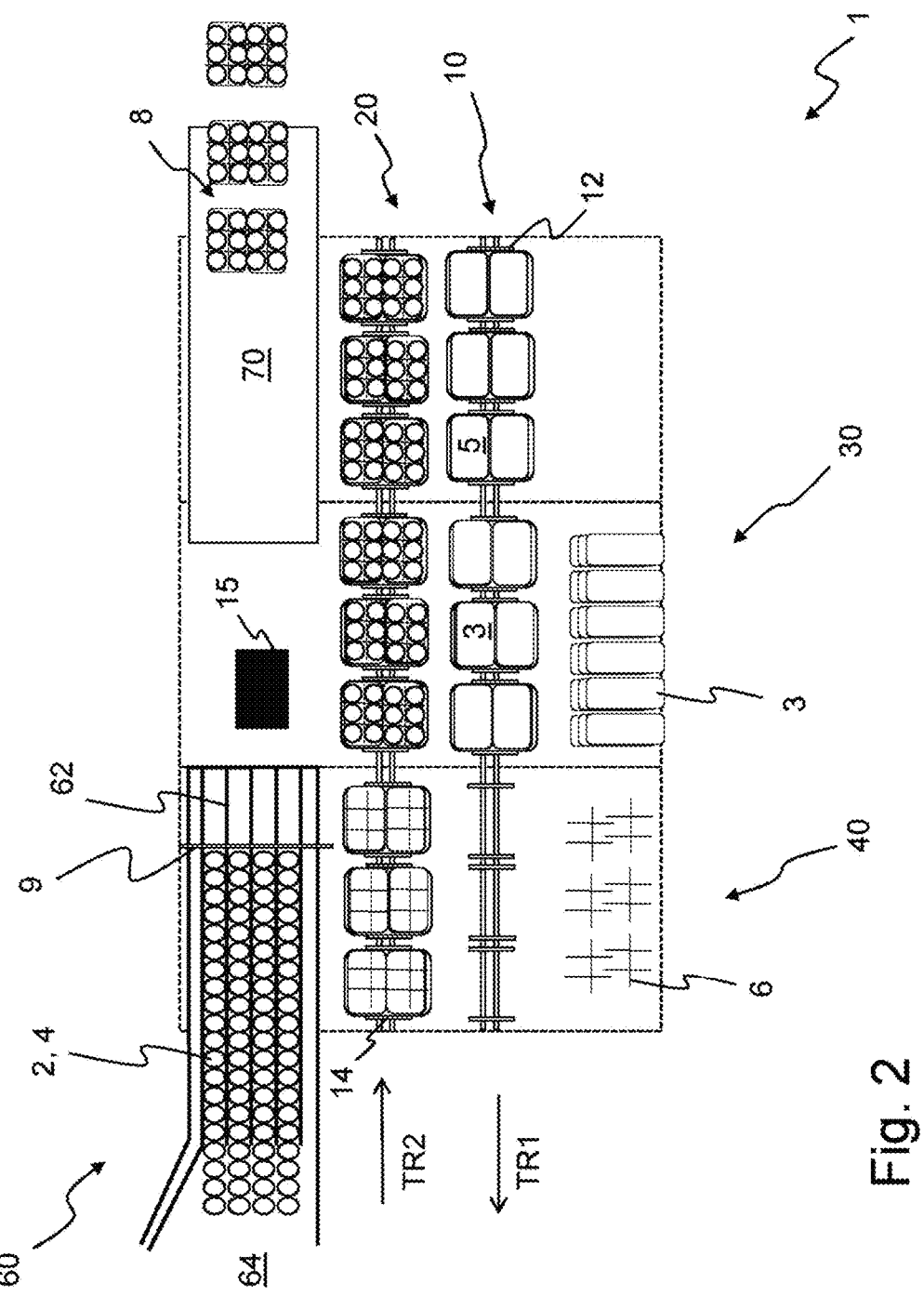
FIG. 2 shows the embodiment of the packaging system according to FIG. 1 and, in conjunction with FIG. 1, illustrates individual aspects of its functionality.

In the embodiment variant shown in FIG. 1, shuttles 5 are returned from the second horizontal conveying device 20 to the first horizontal conveying device 10, wherein the shuttles 5, which are not yet transferred completely to the second horizontal conveying device 20 in FIG. 1, are already completely switched from the second horizontal conveying device 20 to the first horizontal conveying device 10 in FIG. 2 and are held clamped between directly successive holding element 12 of the first horizontal conveying device 10.

In FIGS. 1 and 2, the reference numeral 30 designates, respectively, a magazine or a first magazine in which a plurality of outer packages 3 are accommodated. The outer packages 3 are removed from the magazine 30 by a manipulator 15 and are received by the shuttles 5, which continue to be fixed in a clamping manner on the first horizontal conveying device 10 via the holding element 12.

The outer packages 3 are still folded in the magazine 30. During the transfer to the first horizontal conveying device 10 or during transfer to the shuttles 5 moved from the first horizontal conveying device 10, the outer packages 3 are brought up by the manipulator 15. In addition, the shuttles 5 moved via the first horizontal conveying device 10 are moved without interruption in a transport direction TR1 when the outer packages 3, which are then brought up, are set down on the shuttles 5, which transport direction TR1 is provided by the first horizontal conveying device 10 to move the shuttles 5 and to move the outer packages 3 that are received and brought up by the shuttles 5.

The illustration of FIG. 1 also reveals that the dimensioning of the shuttles 5 is adapted to the dimensioning of the outer packages 3 which are brought up, or that the dimensioning of the shuttles 5 corresponds to the dimensioning of the outer packages 3 which are brought up. The shuttles 5 each form an edge region, via which the brought-up outer packages 3 can be held in a form-fitting or substantially form-fitting manner after a respective reception by a respective shuttle 5. This edge region or this shell 85 can be clearly seen in FIG. 5 which follows.

The packaging system 1 also comprises a second magazine 40 in which a plurality of package dividers 6 are accommodated. The package dividers 6 are removed from the second magazine 40 and inserted into the outer packages 3 which continue to be arranged and brought up on the shuttles 5. The removal of package dividers 6 from the second magazine 40 and the arrangement of removed package dividers 6 in the brought-up outer packages 3 can be carried out via the previously described manipulator 15, which removes the outer packages 3 from the first magazine 30, brings them up, and sets them down on the shuttles 5.

It is also conceivable for a further manipulator to be provided for this purpose which removes package dividers 6 from the second magazine 40 and inserts them in the outer packages 3 already brought up and further moved on shuttles 5 by the first horizontal conveying device 10.

Several chambers are formed, by the respective package divider 6, in the respective outer package 3, wherein a respective chamber is provided for accommodating a respective article 2 designed as a beverage container 4. Temporarily, while a respective package divider 6 is introduced into a respective outer package 3, the respective outer package 3 and the respective shuttle 5 on which the respective outer package 3 continues to stand are moved without interruption along the first transport direction TR1.

Temporarily, after a respective package divider 6 has been introduced into a respective outer package 3, the respective outer package 3, together with the respective shuttle 5 on which the respective outer package 3 continues to stand, switch from the first horizontal conveying device 10 to the second horizontal conveying device 20. It may be the case that, for this purpose, immediately after the introduction of a respective package divider 6 into a respective outer package 3, a push bar with several shuttles 5 and/or with several outer packages 3, into which a respective package divider 6 has already been introduced, makes surface contact and pushes the several shuttles 5, and the outer packages 3 still arranged thereon, perpendicularly to the first transport direction TR1, so that the respective shuttles 5 and the outer packages 3 still arranged thereon are moved in the direction of the second horizontal conveying device 20 or are pushed in the direction of the second horizontal conveying device 20.

Because such a push bar must be moved back in the direction of the first horizontal conveying device 10 in order to receive a further shuttle, and because this limits the throughput for the packaging system 1, embodiments have proven effective in which such a push bar can be dispensed with.

Instead of such a push bar, a transfer unit 78 (see FIGS. 3 and 4) can be provided, with which the shuttles 5 can switch from the first horizontal conveying device 10 to the second horizontal conveying device 20 or via which the shuttles 5 can switch from the second horizontal conveying device 20 to the first horizontal conveying device 10. With such embodiments, in accordance with the following description of FIG. 3 and FIG. 4, the packaging system 1 can be operated at high throughput.

The second horizontal conveying device 20 also has a plurality of holding element 14, which hold a respective shuttle 5 in a clamping manner after its switch from the first horizontal conveying device 10 to the second horizontal conveying device 20.

A further component of the packaging system 1 is formed by an inlet 60 with a conveying device 64 and several channel plates 62 running parallel to one another, between which several mutually-parallel channel plates 62 several rows of articles 2 arranged one behind the other or several rows of beverage containers 4 arranged one behind the other are guided in parallel to each other. A respective article 2 arranged in front or a respective beverage container 4, arranged in front, of a respective row arranged in front is in surface contact with a support bar 9.

The support bar 9 is moved parallel to a second transport direction TR2, along which second transport direction TR2 the second horizontal conveying device 20 moves shuttles 5 with outer packages 3 still arranged thereon and each already having an inserted package divider 6. A movement speed of the support bar 9 is reduced relative to a transport speed of the conveying device 64 designed as a component of the inlet 60, so that articles 2 of a respective row or beverage containers 4 of a respective row accumulate at the support bar 9.

A manipulator denoted by the reference numeral 15 and shown or indicated here merely schematically receives several articles 2 or several beverage containers 4 of the parallel rows from the inlet 60 and, subsequently, in each case sets down an article 2 or a beverage container 4 in a respective chamber formed by the package divider 6 in an outer package 3. The articles 2 or the beverage containers 4 are then received in a form-fitting or substantially form-fitting manner in the chambers formed by the respective package divider 6 of a respective outer package 3.

When the articles 2 or the beverage containers 4 are set down in the respective chamber, the respective shuttle 5 already switched to the second horizontal conveying device 20, together with the outer package 3 still standing thereon and the package divider 6 introduced therein, are moved further along the second transport direction TR2. The respective shuttle 5 already switched to the second horizontal conveying device 20 is still held in a clamping manner on the second horizontal conveying device 20 via the holding element 14 of the second horizontal conveying device 20.

An outer package 3 together with the inserted package divider 6 and the inserted articles 2 used or the inserted beverage containers 4 form a packaging unit 8. A respective packaging unit 8 still accommodated by a shuttle 5 is then transferred to the discharge belt 70 or pushed onto the discharge belt 70. The empty shuttles 5' are thereupon returned to the first horizontal conveying device 10 to receive outer packages 3 again. For this purpose, a push bar can in turn make surface contact with the empty shuttle 5', and the empty shuttles 5' can be pushed from the second horizontal conveying device 20 onto the first horizontal conveying device 10. However, it has proven to be effective if at least one transfer unit 78 (cf. FIGS. 3 and 4) is provided for this purpose.

A combination of FIGS. 1 and 2 here illustrates the switching of the shuttles 5, together with the outer packages 3 located thereon and the inserted package dividers 6, from the first horizontal conveying device 10 to the second horizontal conveying device 20. A combination of FIGS. 1 and 2 also illustrates the return of empty shuttles 5' from the second horizontal conveying device 20 to the first horizontal conveying device 10.

It is also clear from a combination of FIGS. 1 and 2 that the first horizontal conveying device 10 and the second horizontal conveying device 20 operate via transfer units 78 (cf. FIGS. 3 and 4) according to the principle of a rotary machine and circumferentially guide the shuttles 5.

Figure 3:
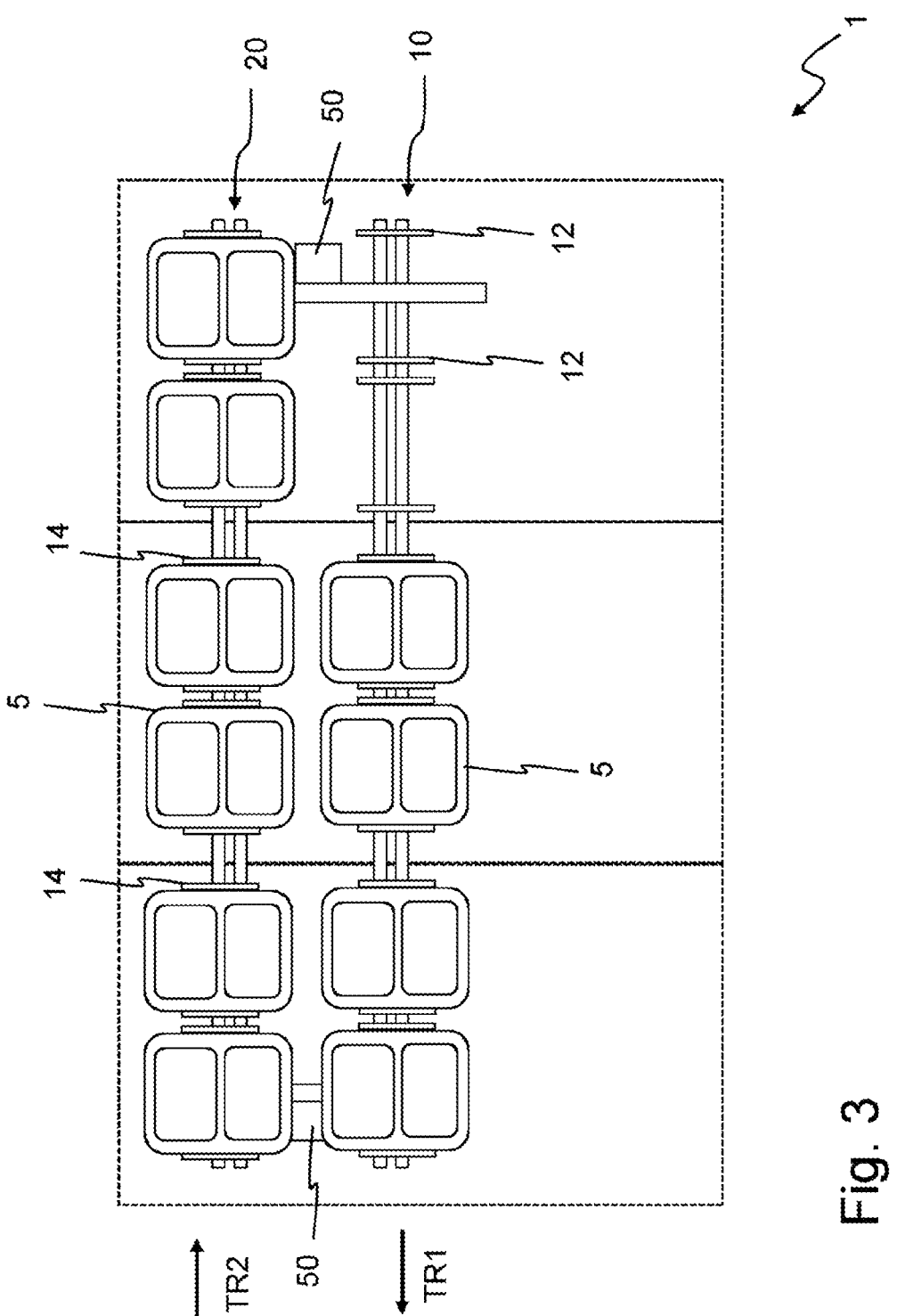
FIG. 3 is a schematic view of an embodiment of a packaging system according to the invention with a mechanism for pushing shuttles back and forth between two horizontal conveying devices.

FIG. 3 shows a functional principle as can be provided in various embodiments of a packaging system 1 according to the invention, and in particular shows an embodiment of a transfer unit 78. Further, FIG. 3 illustrates individual steps as can be provided in various embodiments of the method according to the invention. For reasons of clarity, in order to illustrate the functional principle or the mode of operation of the packaging system 1 in FIG. 3, only the first horizontal conveying device 10, the second horizontal conveying device 20, the holding element 12 and 14, as well as gear wheels 50 have been shown, which can push a respective shuttle 5 from the first horizontal conveying device 10 onto the second horizontal conveying device 20 and from the second horizontal conveying device 20 onto the first horizontal conveying device 10. The discharge belt 70, the inlet 60, the manipulator 15, and the first magazine 30 and the second magazine 40 are missing in the illustration according to FIG. 3, but can also be provided for the functional principle or the operating principle of the packaging system 1 according to FIG. 3.

The embodiment of a packaging system 1 according to FIG. 3 comprises several gear wheels 50 via which shuttles 5 can be pushed from the first horizontal conveying device 10 onto the second horizontal conveying device 20 and from the second horizontal conveying device 20 onto the first horizontal conveying device 10, so that the packaging system 1 operates as a rotary machine.

Each shuttle 5 has a gear rack 58 (not shown in FIG. 3; cf. FIG. 4), which has a gearing 56. The gearing 56 of a respective gear rack 58 can be brought into meshing engagement with a corresponding counter-gearing 54 (cf. FIG. 4) of the gear wheels 50 in order to transfer a respective shuttle 5. Thus, if a respective gear wheel 50 is rotationally moved while engaged with a gearing 56 of a respective gear rack 58, the respective shuttle 5 is pushed from the first horizontal conveying device 10 onto the second horizontal conveying device 20 or from the second horizontal conveying device 20 onto the first horizontal conveying device 10.

The respective gear wheel 50 can be arranged below a transport level designed for the shuttles 5. It may also be the case that the gear wheel 50 is positioned in such a way that the shuttles 5 impinge, with a gear rack 58, arranged on one side of each respective shuttle 5, on the respective gear wheel.

In the embodiment shown in FIG. 3, the number of gear wheels 50 and the positioning thereof is selected such that a single shuttle 5 is pushed from the first horizontal conveying device 10 onto the second horizontal conveying device 20 and from the second horizontal conveying device 20 onto the first horizontal conveying device 10. It is furthermore conceivable that the corresponding number and positioning of the gear wheels 50 be selected such that several shuttles 5 are simultaneously pushed from the first horizontal conveying device 10 onto the second horizontal conveying device 20 or from the second horizontal conveying device 20 onto the first horizontal conveying device 10. For example, it may be the case that the shuttles 5 are pushed in pairs from the first horizontal conveying device 10 onto the second horizontal conveying device 20 or from the second horizontal conveying device 20 onto the first horizontal conveying device 10.

Figure 4:
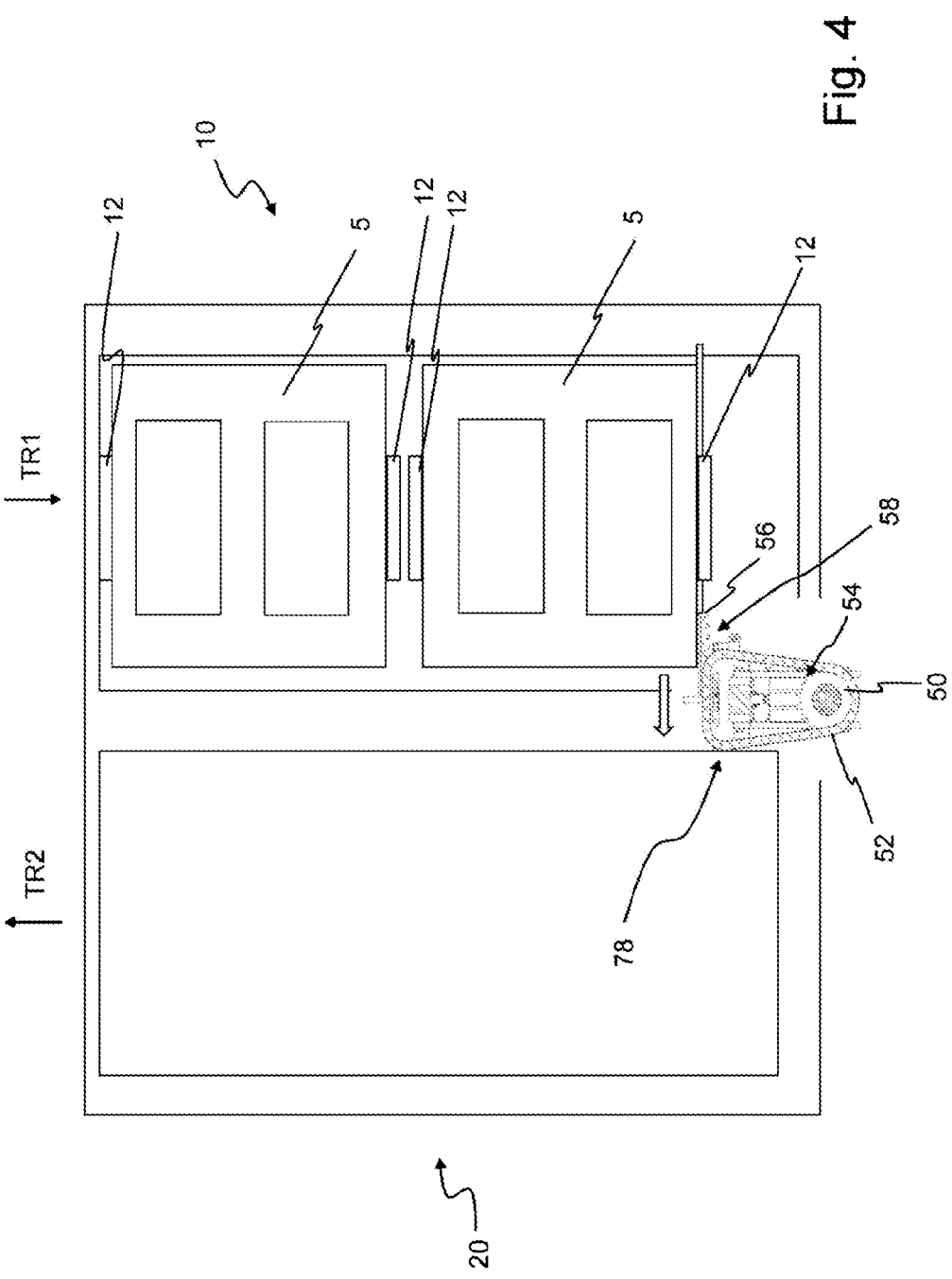
FIG. 4 is a schematic view of a further embodiment of a packaging system according to the invention with a mechanism for pushing shuttles back and forth between two horizontal conveying devices.

FIG. 4 shows a schematic view of a further embodiment of a packaging system 1 according to the invention, with a transfer unit 78 for pushing shuttles 5 from the first horizontal conveying device 10 onto the second horizontal conveying device 20. The exemplary embodiment according to FIG. 4 comprises a further transfer unit 78 which is formed according to the illustrated transfer unit 78 and pushes shuttles from the second horizontal conveying device 20 back onto the first horizontal conveying device 10. The respective transport directions TR1 and TR2 of the horizontal conveying device devices 10 and 20 are also indicated in FIG. 4 by the respective arrow illustration. The shuttles 5 are held between holding elements 12 in the region of the first horizontal conveying device 10. The second horizontal conveying device 20 also has such holding elements, which are not shown in FIG. 4 for reasons of clarity.

The shuttles 5 each have a gear rack 58 which forms a gearing 56 and whose longitudinal extension is oriented to be perpendicular to the transport direction TR1 of the first horizontal conveying device 10. In the present case, the gearing 56 of the gear rack 58 is presently designed as a lantern pinion gearing. Also in the embodiment according to FIG. 4, a gear wheel 50 is provided which is rotationally moved.

A transmission of forces between the counter-gearing 54 of the gear wheel 50 and the gearing 56, designed as pinion gearing, of the gear rack 58 is, in FIG. 4, not carried out by a meshing engagement between the gearing 56 of the gear rack 58 and the counter-gearing 54 of the gear wheel 50. In the embodiment according to FIG. 4, a chain 52 is provided, which is circumferentially driven by a rotating movement of the gear wheel 50.

The mode of operation for transferring or moving a shuttle 5 from the first horizontal conveying device 10 to the second horizontal conveying device 20 can in various embodiments be designed as described below.

If a shuttle 5 moved in the transport direction TR1 by the first horizontal conveying device 10 approaches the chain 52, the gearing 56 of the gear rack 58 comes into engagement with the chain 52 at a certain point in time, as a result of which the entire shuttle 5 is pushed from the first horizontal conveying device 10 onto the second horizontal conveying device 20 due to the circumferential drive of the chain 52. The movement of the shuttle 5 is thus carried out along a direction of movement which extends perpendicularly to the transport directions TR1 and TR2. After complete transfer to the second horizontal conveying device 20, the respective shuttle 5 is then moved along the transport direction TR2 by corresponding holding element 14 via the second horizontal conveying device 20.

The movement or the return of a respective shuttle 5 from the second horizontal conveying device 20 to the first horizontal conveying device 10 is also carried out by the described engagement between a gear rack 58 and a chain 52, which chain 52 is circumferentially driven via a rotating gear wheel 50. This chain 52 or this rotating gear wheel 50, which rotationally drives this chain 52, are not illustrated in FIG. 4.

Alternatively to this, the mode of operation for transferring or moving a shuttle 5 from the first horizontal conveying device 10 to the second horizontal conveying device 20 can in various embodiments be designed as described below.

If a shuttle 5 moved in the transport direction TR1 by the first horizontal conveying device 10 approaches an end region of the first horizontal conveying device 10, the shuttle 5 is centered in the end region, wherein the shuttle 5 is brought into a defined orientation. In this case, the transfer unit 78 is initially located below a transport level formed via the horizontal conveying devices 10 and 20 for moving the shuttles 5, and is then raised in the vertical direction, wherein the gearing 56 of the gear rack 58 of a shuttle 5 respectively already centered or brought into the defined alignment is engaged with the chain 52.

Subsequently, the gear wheel 50 is rotationally moved, whereby the chain 52 is circumferentially driven. As a result, the respective shuttle 5 is pushed from the first horizontal conveying device 10 onto the second horizontal conveying device 20. The movement of the shuttle 5 is thus carried out along a direction of movement which extends perpendicularly to the transport directions TR1 and TR2. After the shuttle 5 has switched completely from the first horizontal conveying device 10 to the second horizontal conveying device 20, the transfer unit 78 again dips below the transport level formed for moving the shuttles 5, for which purpose the transfer unit 78 is lowered in the vertical direction. As a result, the engagement between the gearing 56 of the gear rack 58 and the chain 52 is removed.

Subsequently, the respective shuttle 5 is then moved along the transport direction TR2 by corresponding holding element 14 via the second horizontal conveying device 20. The movement or the return of a respective shuttle 5 from the second horizontal conveying device 20 to the first horizontal conveying device 10 is also carried out by the described principle, wherein a further transfer unit 78 (not shown in FIG. 4), for a respective engagement with a gearing 56 of a gear rack 58 and for releasing an engagement with a gearing 56 of a respective gear rack 58, is raised in the vertical direction or lowered in the vertical direction. The vertical lifting and the vertical lowering of the transfer unit 78 can be carried out pneumatically.

Figure 5:
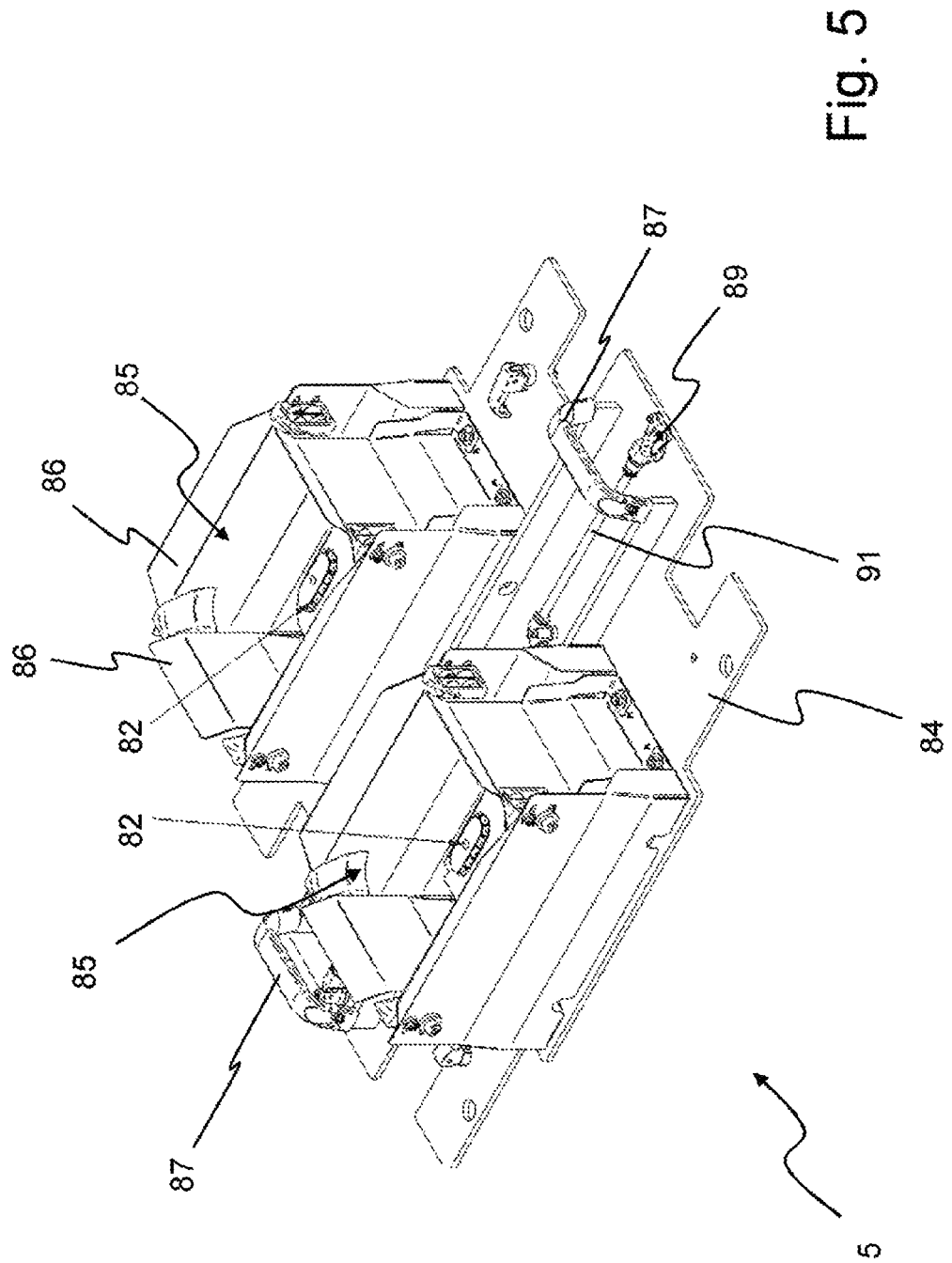
FIGS. 5 through 7 show different views of an embodiment of a shuttle according to the invention.

FIG. 5 shows a schematic, perspective view of an embodiment of a shuttle 5 according to the invention. The shuttle 5 comprises a support plate 84 on which two handles 87 are arranged in order to be able to manually remove the shuttle 5 from a horizontal conveying device 10 or 20 or set it down on the respective horizontal conveying device 10 or 20. Two shells 85 are arranged on the support plate 84, wherein a respective shell 85 can accommodate a respective outer package 3.

In order for the respective outer package 3 to not be damaged during the introduction into a respective connection 85, the shells 85 each form several tabs 86 which guide the respective outer package 3 during introduction into the respective shell 85, and also act here as centering.

In the case of packaging systems known from the prior art, it is occasionally the case in practice that a manipulator removes an outer package 3—in some cases, from a magazine-brings it up, and then sets it down on a horizontal conveying device. If the manipulator then leaves the respective outer package 3, parts of the manipulator can still be in contact with the outer package 3, as a result of which the outer package 3 is in some cases again removed from the horizontal conveying device, or unintentionally slips and/or tilts.

Figure 6:
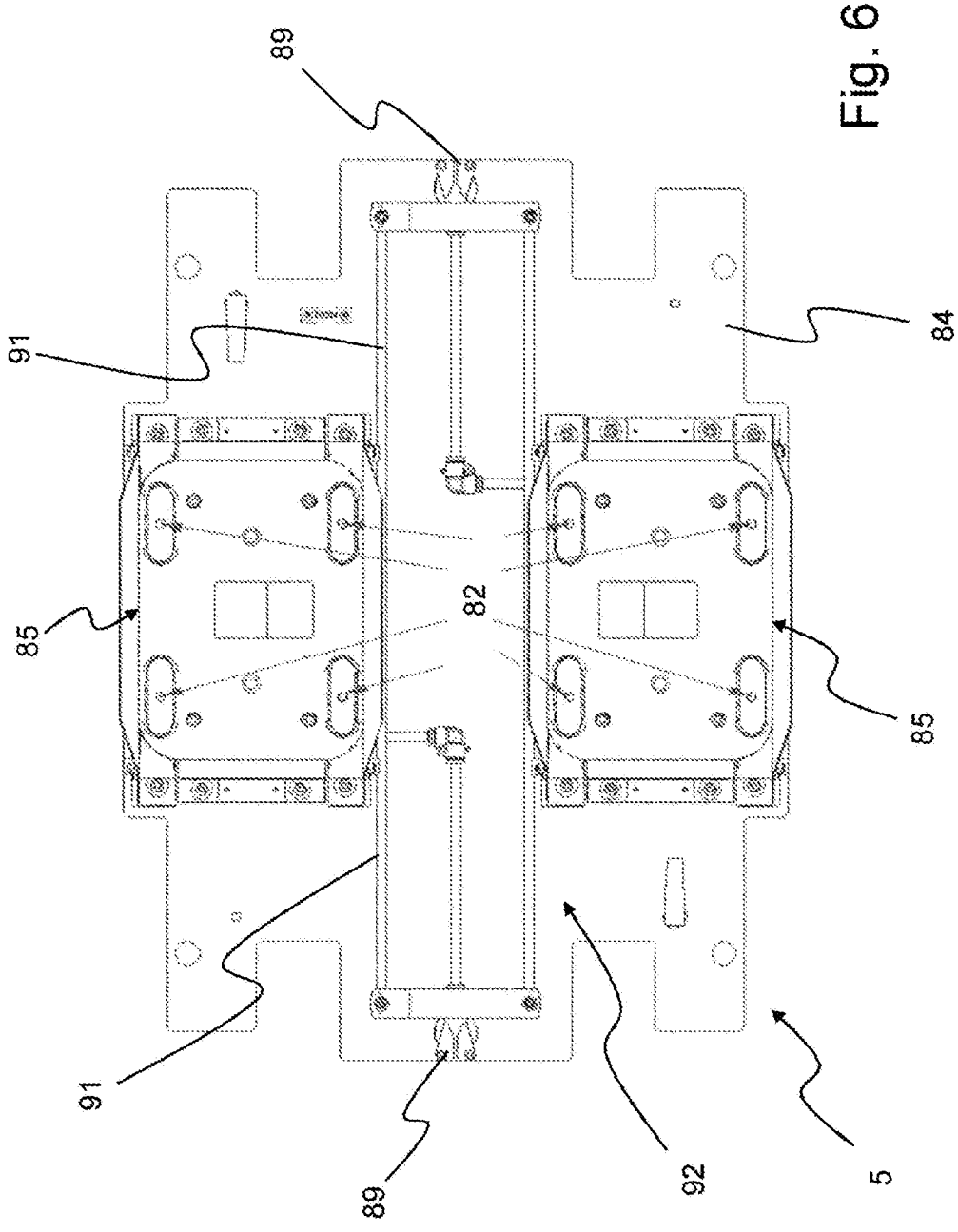

In order to avoid such problems, the shuttles 5 each comprise several suction elements 82, which can be seen in FIG. 5 and also, respectively, in the plan view according to FIG. 6. Via the suction elements 82, a respective outer package 3 can be held via negative pressure if the respective manipulator provided for insertion into a respective shell 85 leaves the respective outer package 3 again. In this case, the suction elements 82 are in surface contact with a respective bottom side of a respective outer package 3 and, due to the application of negative pressure, cause the respective outer package 3 to be temporarily fixed to the shuttle 5.

FIGS. 5 and 6 each show that the suction elements 82 can be subjected to negative pressure via pneumatic lines 91. The pneumatic lines 91 form a common line system 92 for the suction elements 82, so that all suction elements 82 can be subjected to negative pressure simultaneously or approximately simultaneously via the common line system 92.

The pneumatic lines 91 also open into the pneumatic connections, which are shown in FIGS. 5 and 6 in each case with reference to numeral 89. In the exemplary embodiment according to FIGS. 5 through 7, each shuttle 5 has exactly two shells 85, so that each shuttle 5 can simultaneously receive exactly two outer packages 3 via the exactly two shells 85. In the embodiment of a shuttle 5 according to FIGS. 5 through 7, each of the exactly two shells 85 has exactly four suction elements 82, which can grip a respective outer package 3 on its bottom side via negative pressure when the respective manipulator is removed from the respective outer package 3.

Figure 7:
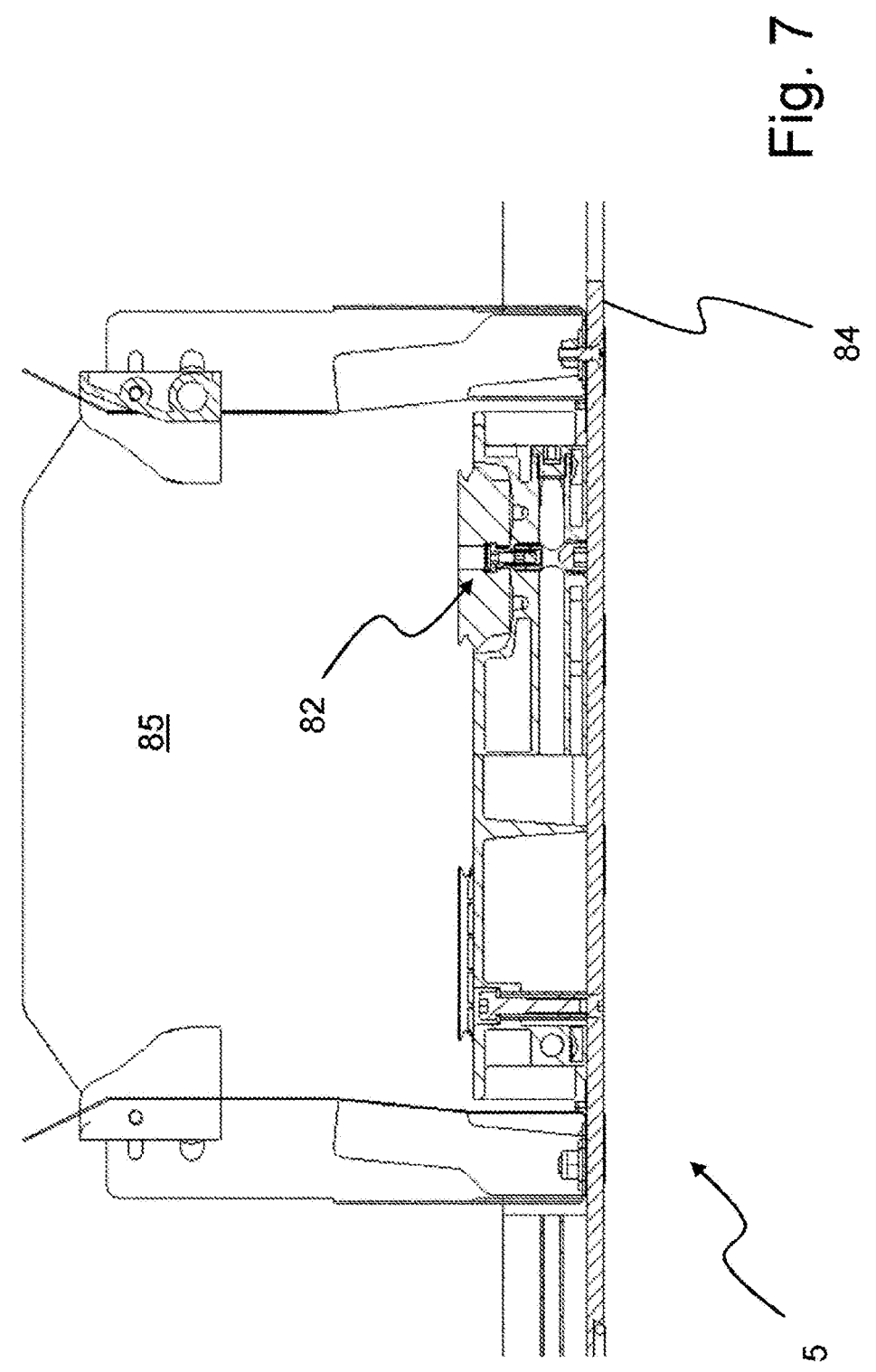

FIG. 7 shows a section through the embodiment of a shuttle 5 according to FIGS. 5 and 6 and—in particular, once again in section-reveals a suction element 82 which is subjected to negative pressure via the pneumatic lines 91. The shell 85 is still arranged on the support plate 84 and can accommodate a respective outer package 3 in a form-fitting manner.

Figure 8:
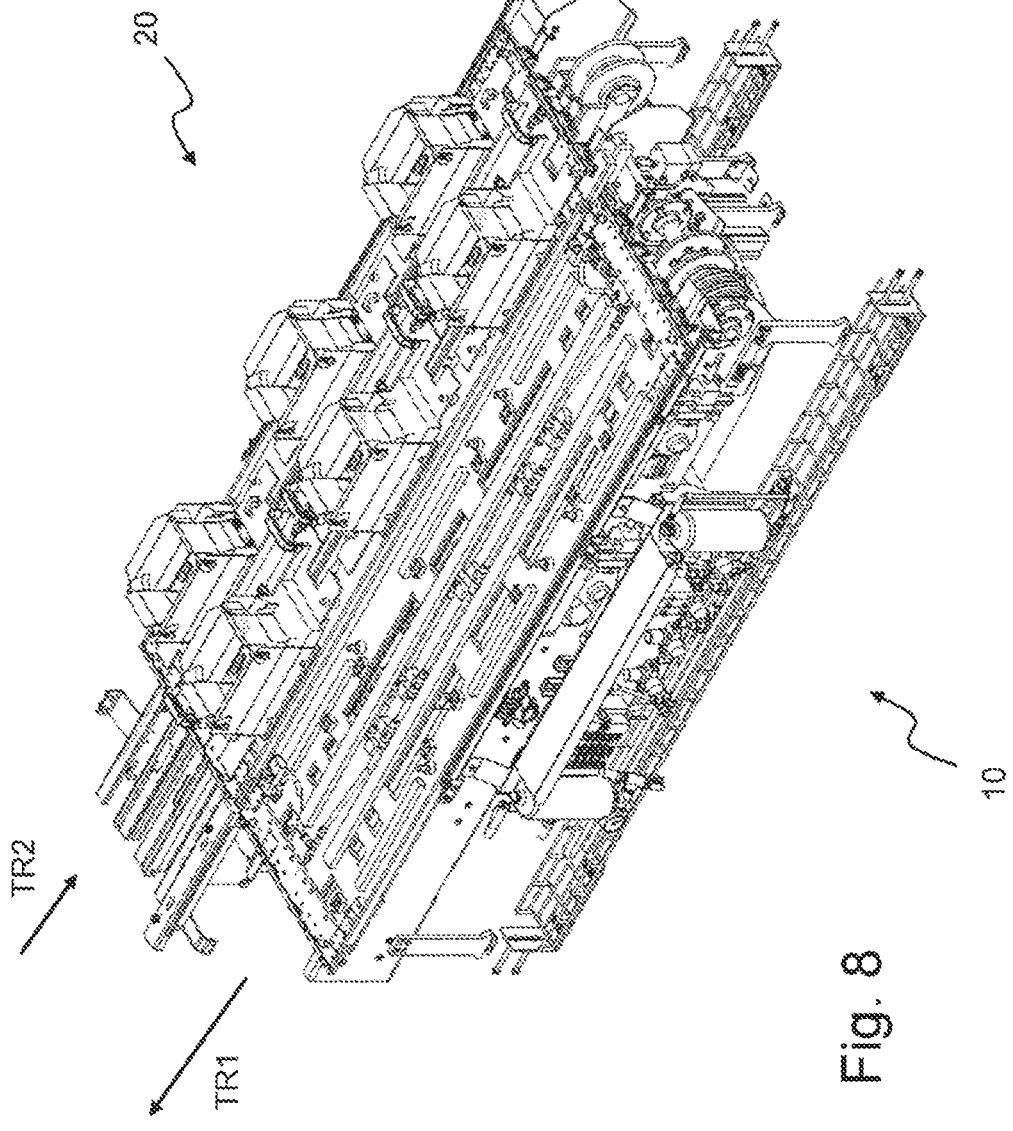
FIG. 8 shows a schematic, perspective view of two horizontal conveying device with shuttles arranged thereon, as they can be provided as a component of various embodiments of a packaging system according to the invention.

FIG. 8 shows a schematic, perspective view of two horizontal conveying device 10 and 20 with shuttles 5 arranged thereon, as can be provided as a component of various embodiments of a packaging system 1 according to the invention. The shuttles 5 are still moved in the transport direction TR1 via the first horizontal conveying device 10. The second horizontal conveying device 20 moves the shuttles 5 along the transport direction TR2.

From the first horizontal conveying device 10, the shuttles 5 are pushed onto the second horizontal conveying device 20 via a transfer unit 78 (cf. FIGS. 3 and 4). The shuttles 5 are then pushed back from the second horizontal conveying device 20 via a corresponding transfer unit 78 (cf. FIGS. 3 and 4). The horizontal conveying devices 10 and 20 and the transfer units 78 thus form a rotary machine for the shuttles 5. The shuttles 5 correspond to the exemplary embodiment described above with respect to FIGS. 5 through 7 and can be manually removed from the respective horizontal conveying device 10 or 20 via the handles, shown there for reference with numeral 87.

Figure 9:
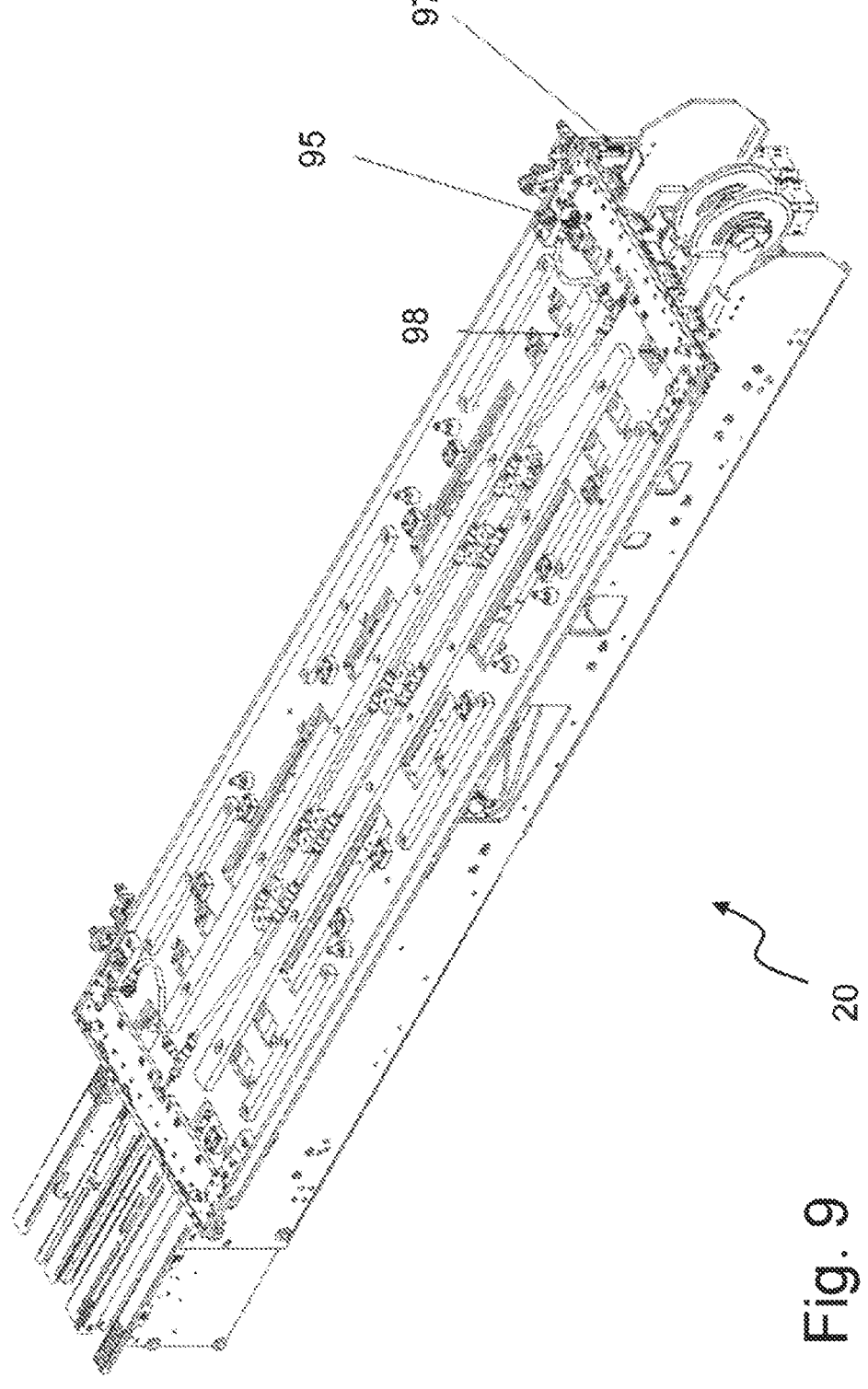
FIG. 9 shows further details of the embodiment of a second horizontal conveying device according to FIG. 8.

FIG. 9 shows further details of the embodiment of a second horizontal conveying device 20 according to FIG. 8. In the illustration according to FIG. 9, the shuttles 5 have been removed from the horizontal conveying device 20 so that further components can be seen.

Thus, FIG. 9 shows a connecting piece 95 which can transmit a negative pressure to a pneumatic line system 92, which then supplies the individual shuttles 5 with negative pressure. The vacuum supply is in this case such that individual shuttles 5 can be supplied selectively with negative pressure at a certain point in time when a respective manipulator provided for introducing an outer package 3 into a shell 85 of the respective shuttle 5 leaves the respective shuttle 5. Numeral 97 refers to a centering with which the ground shuttle shown by reference to numeral 98 can be aligned.

Figure 10:
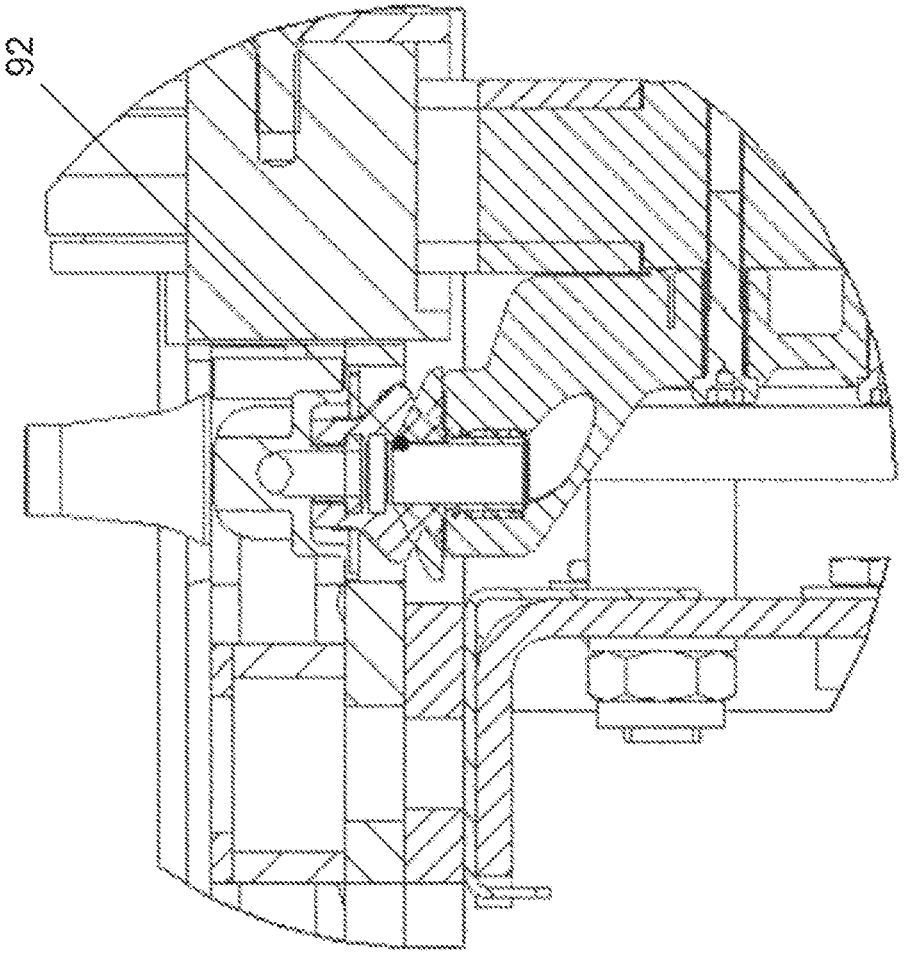
FIG. 10 is a sectional view of further aspects of the embodiment of a second horizontal conveying device according to FIG. 9.

FIG. 10 is a sectional view of further aspects of the embodiment of a second horizontal conveying device 20 according to FIG. 9. In particular, FIG. 10 shows a section of a connecting piece via which the shuttles 5 can be supplied with negative pressure.

Figures 11A, 11B, 11C:
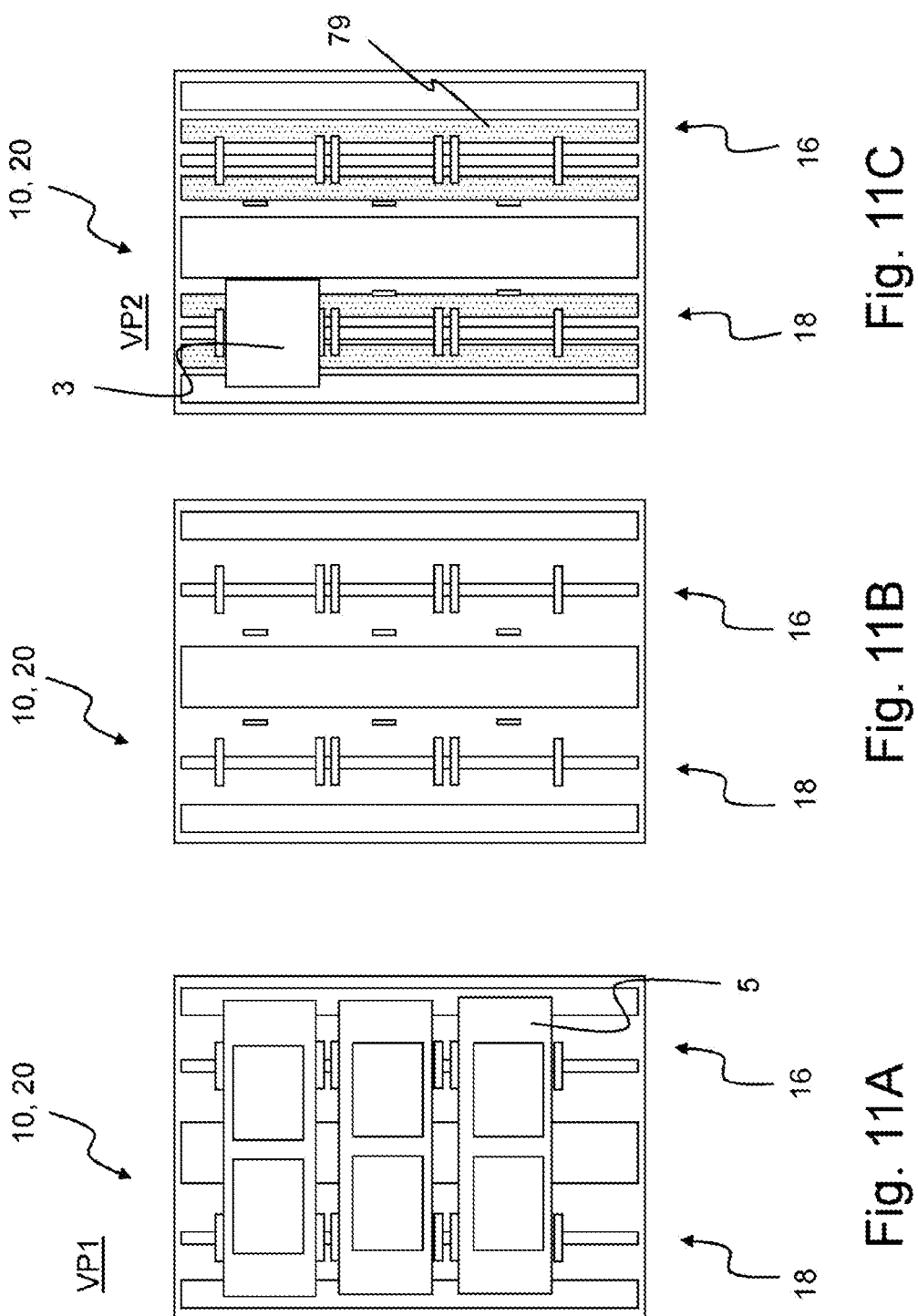
FIG. 11 illustrates in total three schematic views (FIG. 11A, FIG. 11B, and FIG. 11C) of different packaging processes which can be carried out in various embodiments by a packaging system according to the invention.

FIGS. 11A, 11B, and 11C illustrate different packaging processes VP1 and VP2, which in various embodiments can be carried out by a packaging system 1 according to the invention. The representations according to FIGS. 11A through 11C can relate to a first horizontal conveying device 10 or a second horizontal conveying device 20, as has already been described in the preceding exemplary embodiments.

The first horizontal conveying device 10 or the second horizontal conveying device 20 respectively form two conveyor sections 16 and 18 running parallel to one another. FIG. 11A shows a packaging process VP1 in which the conveyor sections 16 and 18 together transport a shuttle 5. Such a packaging process VP1 is formed, for example, by the packaging system 1, as has already been described above in reference to FIGS. 1 through 3.

FIG. 11B, then, illustrates a switching of a packaging system 1 to a further packaging process VP2. The shuttles 5, which are still arranged on the first horizontal conveying device 10 or on the second horizontal conveying device 20 during the packaging process VP1, have, in FIG. 11B, already been removed from the first horizontal conveying device 10 or from the second horizontal conveying device 20.

FIG. 11C, then, shows that several transfer plates 79 have been arranged along the first conveyor section 16 and along the second conveyor section 18 for performing the further packaging process VP2. This makes it possible for a deployment device (not shown in FIGS. 11A through 11C), making surface contact with the transfer plates 79, to push an outer package 3 from the first conveying section 16 to the second conveying section 18.

Shuttles 5, which can accommodate a respective outer package 3, are not provided during the further packaging process VP2. Such a packaging system 1, which can selectively carry out both packaging processes VP1 or VP2, has very high flexibility with regard to the handling of different outer packages 3.

Figure 12:
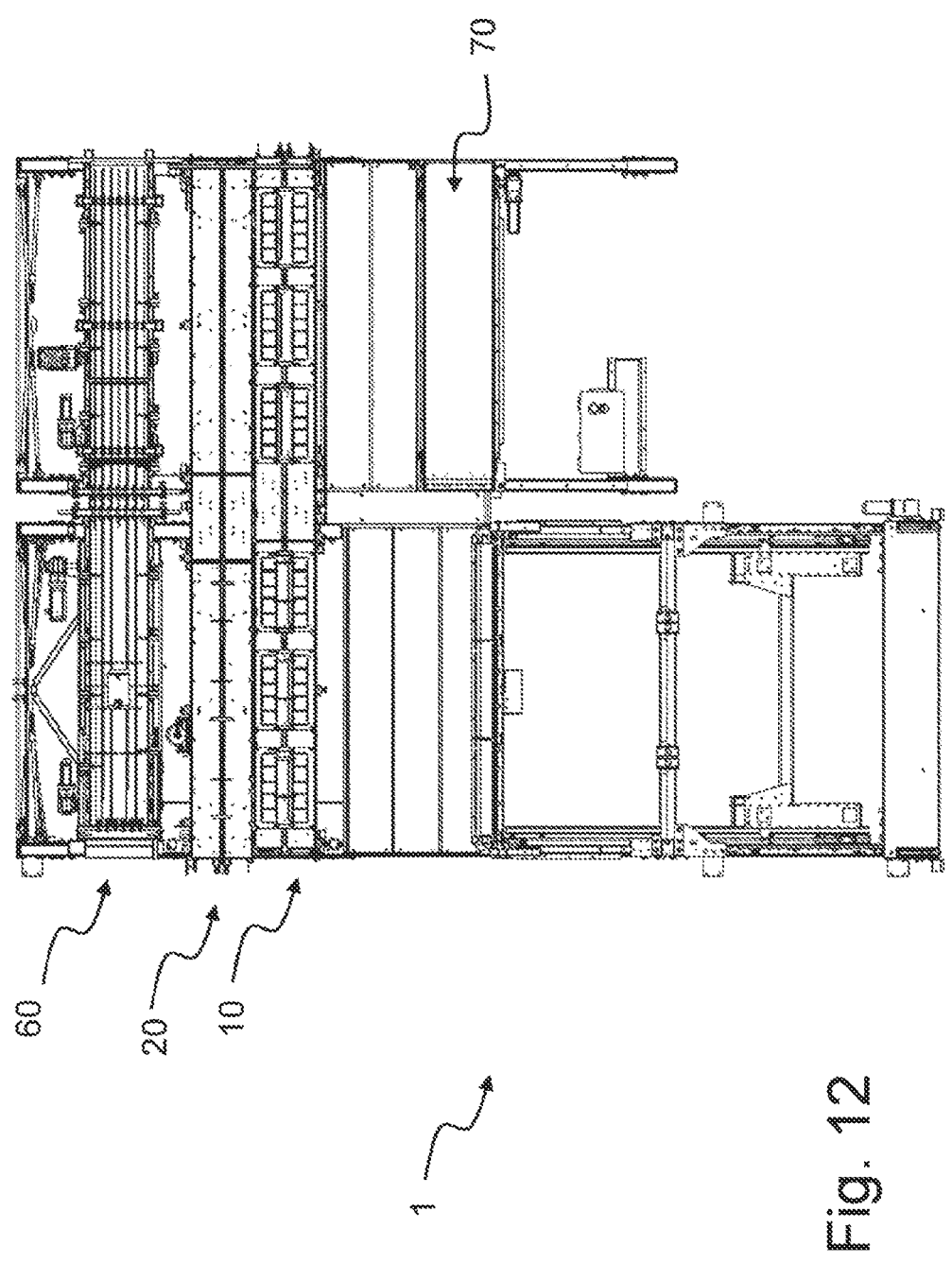
FIGS. 12 through 14 show further individual parts and modules of a further embodiment of a packaging system according to the invention.
Figure 13:
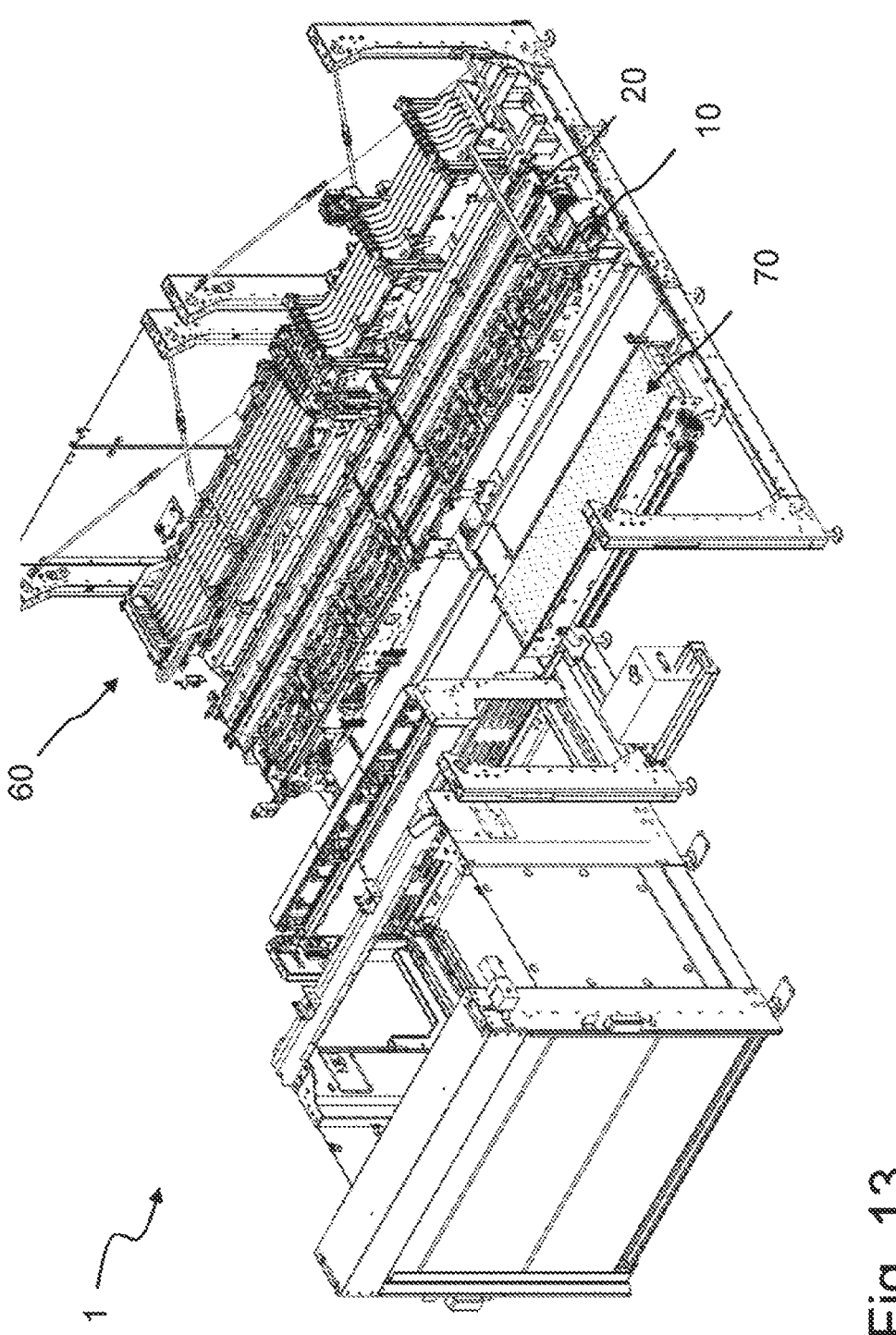
Figure 14:
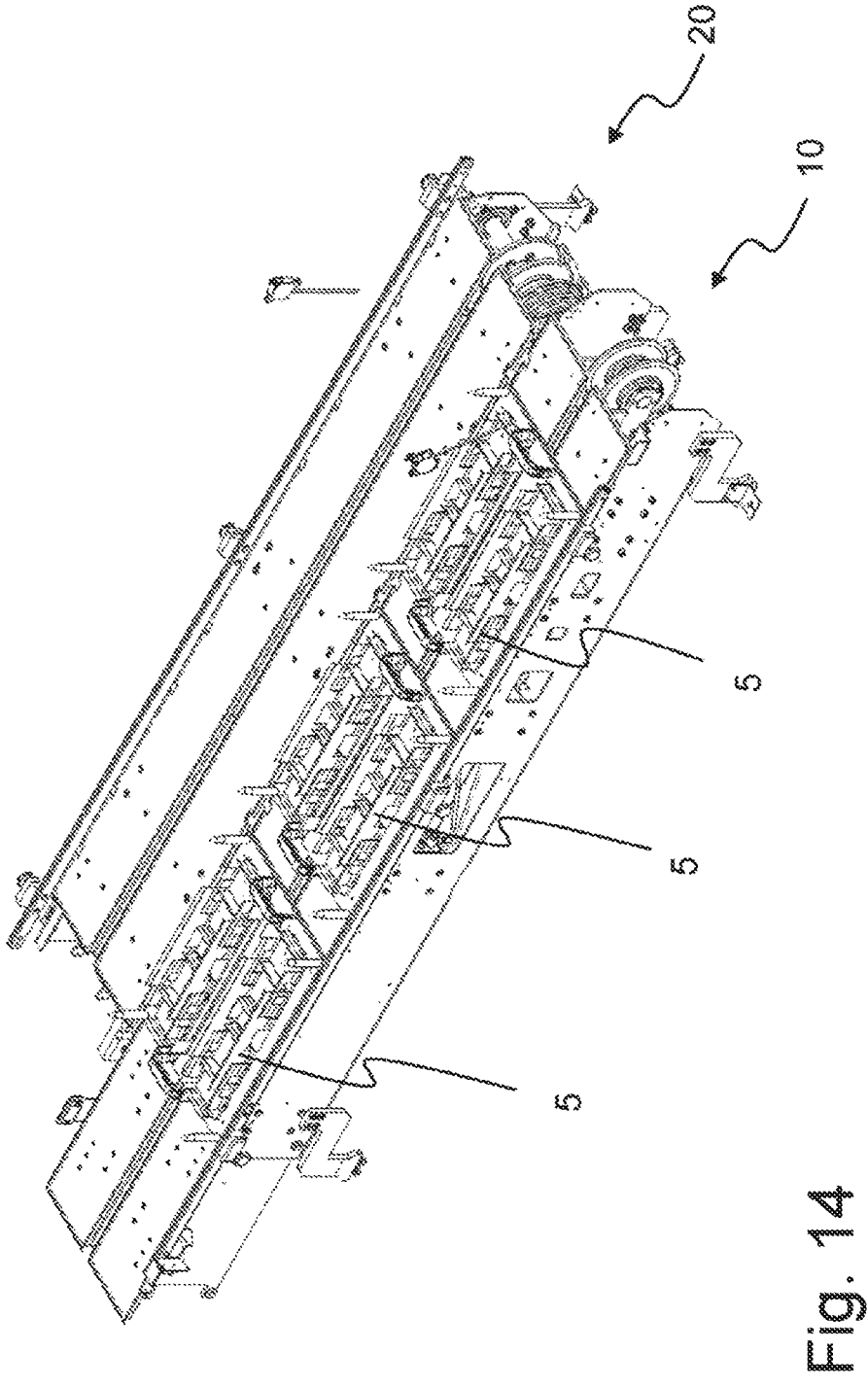

FIGS. 12 through 14 show a further embodiment of a packaging system 1 according to the invention. The packaging system 1 operates according to the principle of the embodiment described above with respect to FIGS. 1 through 3, such that reference can be made to the above description for these figures. FIGS. 12 and 13 each show the inlet 60, the first horizontal conveying device 10, the second horizontal conveying device 20, and the discharge belt 70.

FIG. 14 again shows the first horizontal conveying device 10 and the second horizontal conveying device 20 together with shuttles 5, which are arranged on the first horizontal conveying device 10.

The invention has been described with reference to a preferred embodiment. However, it is conceivable for a person skilled in the art that modifications or changes can be made to the invention without departing from the scope of protection of the following claims.

LIST OF REFERENCE SIGNS

1 Packaging system
2 Article
3 Outer package
4 Beverage container
5 Shuttle
5' Shuttle
6 Package dividers
8 Packaging unit
9 Support bar
10 First horizontal conveying device
12 Holding element
14 Holding element
15 Manipulator
16 First conveyor section
18 Second conveyor section
20 Second horizontal conveying device
30 Magazine, first magazine
40 Magazine, second magazine
50 Gear wheel
52 Chain
54 Counter-gearing
56 Gearing
58 Gear rack
60 Inlet
62 Channel plate
64 Conveying device
70 Discharge belt
78 Transfer unit
79 Transfer plate
82 Suction element
84 Support plate
85 Shell
86 Tab
87 Handle
89 Pneumatic connection
91 Pneumatic line
92 Common line system
95 Connecting piece 97 Centering
98 Base shuttle
TR1 Transport direction
TR2 Transport direction
VP1 Packaging process
VP2 Further packaging process

The invention claimed is:

1. A method for packaging articles (2), comprising:
bringing up folded outer packages (3);
setting down the brought up outer packages (3) on at least one horizontal conveying device (10, 20), wherein the at least one horizontal conveying device (10, 20) transports the brought up outer packages (3) along a packaging line, wherein the brought up outer packages (3) are each received in a shuttle (5), wherein the shuttles (5) each temporarily fix a received outer package (3) via negative pressure provided by a connecting piece (95), which can transmit negative pressure to a common line system (92), which then supplies the individual shuttles (5) with negative pressure,
during the transport along the packaging line, introducing articles (2), via at least one manipulator (15) into the outer packages (3) already set down on the at least one horizontal conveying device (10, 20),
removing the outer packages (3), together with the introduced articles (2), from the at least one horizontal conveying device (10, 20) as a packaging unit (8), and
carrying out a first packaging process (VP1) in which the outer packages (3) are received by the at least one horizontal conveying device (10, 20) via shuttles (5), wherein the outer packages (3) stand on the shuttles (5) until the outer packages (3), together with the introduced articles (2), are removed from the at least one horizontal conveying device (10, 20) as a packaging unit (8), and
comprising switching from the first packaging process (VP1) to a second packaging process (VP2) by removing the shuttles from the at least one horizontal conveying device (10, 30) and arranging at least one transfer plate (79) along two parallel conveyor portions (16, 18) of the at least one horizontal conveying device (10, 20), wherein during the second packaging process (VP2), the outer packages (3) make surface contact with at least one transfer plate (79) in the absence of shuttles.

2. The method of claim 1, wherein each of the shuttles (5) has a plurality of suction elements (82) via which each of the shuttles (5) temporarily fixes the received outer package (3) via negative pressure and wherein the plurality of suction elements (82) are assigned to the common line system (92) of the respective shuttle (5).

3. The method of claim 1, wherein the brought up outer packages (3) are received by a first horizontal conveying device (10) via the shuttles (5) and, together with the respective shuttle (5) thereof, switch to a second horizontal conveying device (20), on which second horizontal conveying device (20) the articles (2) are introduced by the at least one manipulator (15) into the outer packages (3), wherein:
the shuttles (5) for switching from the first horizontal conveying device (10) to the second horizontal conveying device (20) are moved by a transfer unit (78) from the first horizontal conveying device (10) to the second horizontal conveying device (20), which transfer unit (78) is located at least partially or completely below a transport level formed for the shuttles (5), or wherein:

the shuttles (5) for returning from the second horizontal conveying device (20) to the first horizontal conveying device (10) are moved by a transfer unit (78) from the second horizontal conveying device (20) to the first horizontal conveying device (10), which transfer unit (8) is located at least partially or completely below a transport level formed for the shuttles (5).

4. The method of claim 3, wherein each of the shuttles (5) have a gearing (56) to move the shuttles (5) from the first horizontal conveying device (10) to the second horizontal conveying device (20) or, to move the shuttles (5) from the second horizontal conveying device (20) to the first horizontal conveying device (10).

5. The method of claim 4, wherein at least one gear wheel (50) circumferentially drives at least one chain (52), wherein the at least one chain (52) is brought into engagement with gearing (56) of a respective shuttle (5) the result being that:

the shuttles (5) are moved from the first horizontal conveying device (10) to the second horizontal conveying device (20), or the shuttles (5) are moved from the second horizontal conveying device (20) to the first horizontal conveying device (10).

6. The method of claim 5, wherein the gearing (56) is formed via a gear rack (58).

7. The method of claim 1, wherein the bringing up step further comprising simultaneously bringing up a plurality of outer packages (3).

8. The method of claim 1 further comprising arranging at least one transfer plate (79) along two parallel conveyor sections (16, 18) of the at least one horizontal conveying device (10, 30).

9. The method of claim 8, wherein the outer packages (3) are received in a first conveyor section (16) and then are pushed onto a second conveyor section (18), on which second conveyor section (18) the articles (2) are introduced by the at least one manipulator (15) into the outer packages (3), whereupon the outer packages (3), together with the introduced articles (2), are then removed as a packaging unit (8) from the second conveyor section (18).

10. A packaging system (1) for packaging articles (2), the system comprising:

at least one horizontal conveying device (10, 20), a plurality of shuttles (5), each having at least one shell (85), releasably arranged on the at least one horizontal conveying device (10, 20) so that outer packages (3) can be set down in the at least one shell (85) on the several shuttles (5), and articles (2) can be inserted into the outer packages (3) so as to carry out a first packaging process (VP1), wherein each of the plurality of shuttles (5) can temporarily fix the outer packages, and wherein, for a second packaging process (VP2), the several shuttles (5) are removed from the at least one horizontal conveying device (10, 20), and at least one transfer plate (79) is arranged along two conveyor sections (16, 18), which two conveyor sections (16, 18) form the at least one horizontal conveying device (10, 20), wherein, during the second packaging process (VP2), the outer packages (3) make surface contact with at least one transfer plate (79) in the absence of shuttles.

11. The packaging system of claim 10, wherein each of the plurality of shuttles (5) has a plurality of suction elements (82), via which the plurality of suction elements (82) can fix the outer packages (3) temporarily via negative pressure, and wherein the plurality of shuttles (5) each comprise a common line system (92) for the respective the plurality of suction elements (82), via which common line system (92) each of the plurality of suction elements (82) of a respective shuttle (5) are fluidically connected one to another.

12. The packaging system according claim 10, wherein the at least one horizonal conveying device comprises a first horizontal conveying device (10) and a second horizontal conveying device (20), wherein the outer packages (3) can be set down on the plurality of shuttles (5) releasably arranged on the first horizontal conveying device (10), and wherein the articles (3) can be introduced into the plurality of shuttles (5) arranged releasably on the second horizontal conveying device (20), and wherein at least one transfer unit (78) moves the plurality of shuttles from the first horizontal conveying device to the second horizontal conveying device, or wherein the at least one transfer unit (78) returns the plurality of shuttles (5) from the second horizontal conveying device (20) to the first horizontal conveying device (10), and wherein the at least one transfer unit (78) be at least partially or completely below a transport level designed for the shuttles (5).

13. The packaging system claim 12, wherein each of the plurality of shuttles (5) have a gearing (56), and the at least one transfer unit (78), while engaged with a respective gearing (56) of a respective shuttle (5), can move the plurality of shuttles (5) from the first horizontal conveying device (10) to the second horizontal conveying device (20) or move the plurality of shuttles (5) from the second horizontal conveying device (20) to the first horizontal conveying device (10).

14. The packaging system of claim 13, wherein the gearing (56) comprises a lantern pinion gearing, and wherein the at least one transfer unit (78) comprises at least one gear wheel (50) and at least one chain (52) circumferentially driven via the at least one gear wheel (50), with which at least one chain (52) circumferentially driven by the at least one gear wheel (50), the respective shuttle (5) can be temporarily brought into engagement via the gearing (54) for a movement from the first horizontal conveying device (10) to the second horizontal conveying device (20) or for the movement from the second horizontal conveying device (20) to the first horizontal conveying device (10).

15. The packaging system (1) of claim 10, wherein each of the plurality of shuttles (5) comprises two shells (85).

16. The packaging system (1) of claim 10, wherein the connecting piece (95) is adapted to selectively supply negative pressure to individual shuttles (5) when the outer package (3) are left set down on the shuttle (5).

17. The packaging system of claim 10, wherein the at least one transfer plate (79) is arranged along two parallel conveyor sections (16, 18) of the at least one horizontal conveying device (10, 30).

18. A packaging system (1) for packaging articles (2), the system comprising:

at least one first horizontal conveying device (10), at least one second horizontal conveying device (20), at least one transfer unit (78) having at least one gear wheel (50) adapted to circumferentially drive at least one chain (52), a plurality of shuttles (5) releasably arranged on the at least one first horizontal conveying device (10) so that outer packages (3) can be set down on the several shuttles (5), and articles (2) can be inserted into the outer packages (3) set down on the several shuttles (5) so as to carry out a first packaging process (VP1), wherein each of the plurality of shuttles (5) can temporarily fix the outer packages (3) via negative pressure provided by a connecting piece (95), which can transmit negative pressure to a common line system (92), which then supplies the individual shuttles (5) with negative pressure, and wherein each of the plurality of shuttles (5) comprise gearing (56) that engages with the at least one chain (52) driven by the at least one gear wheel (50) of the at least one transfer unit (78) to move the shuttles (5) from the at least one first horizontal conveying device (10) to the at least one second horizontal conveying device (20), and vice versa.

\* \* \* \* \*